United States Patent [19]

Samour et al.

[11] 3,718,693
[45] Feb. 27, 1973

[54] MONOMERIC EMULSION STABILIZERS CONTAINING AN N-DIALLYLACETAMIDO OR N-DIMETHALLYLACETAMIDO RADICAL

[75] Inventors: Carlos M. Samour, Wellesley; Mildred C. Richards, Wakefield, both of Mass.

[73] Assignee: The Kendall Company, Walpole, Mass.

[22] Filed: May 26, 1970

[21] Appl. No.: 40,715

[52] U.S. Cl...260/561 A, 260/29.6 MN, 260/29.6 H, 260/86.1, 260/247.2 A, 260/294 A, 260/404.5, 260/482 P, 260/485, 260/534, 260/537, 260/567.6 M
[51] Int. Cl............................................C07c 103/30
[58] Field of Search................................260/561 A

[56] References Cited

UNITED STATES PATENTS

| | | | |
|---|---|---|---|
| 2,168,253 | 8/1939 | Balle et al. | 260/561 A |
| 2,176,896 | 10/1939 | Epstein et al. | 260/561 R |
| 2,411,662 | 11/1946 | Martin et al. | 260/561 A |

*Primary Examiner*—Elbert L. Roberts
*Assistant Examiner*—Ethel G. Love
*Attorney*—Ellen P. Trevors and Robert D. Chodera

[57] ABSTRACT

Quaternary ammonium salts having an N-diallylacetamido or N-dimethallylacetamido radical and a lipophilic radical covalently linked to the quaternized nitrogen are disclosed. These quaternary ammonium salts are useful as monomeric emulsion stabilizers.

11 Claims, No Drawings

MONOMERIC EMULSION STABILIZERS CONTAINING AN N-DIALLYLACETAMIDO OR N-DIMETHALLYLACETAMIDO RADICAL

This invention relates to stabilizing agents for emulsion polymerization. More particularly it relates to a class of quaternized organic salts which serve simultaneously as stabilizing agents for emulsion polymerizations and as monomeric reactants in the polymerization, so that the salts become an integral part of the polymer, which is thereby self-stabilized without the use of surfactants.

Polymeric latices, derived from ethylenically-unsaturated monomers, are widely used for a variety of applications, such as adhesive masses and binders for nonwoven fabrics. Most conventional polymeric latices are produced by an emulsion polymerization process, in which monomeric materials are polymerized while they are dispersed in an aqueous medium by means of a surface active agent. The surface active agent may be anionic in nature, such as soap or sodium lauryl sulfate. Alternatively, it may be of a nonionic type as represented by various ethylene oxide derivatives, or by polyhydroxy compounds, or it may be cationic, as represented by alkyl ammonium halides. Cationic agents are preferably combined with a nonionic agent for improved performance. The polymerization of monomeric materials is also frequently affected in the presence of water-soluble protective colloids or stabilizing agents. Any of the above emulsifying or stabilizing agent leads to the presence of a water-sensitive ingredient in the final polymeric latex. For latex utilizations wherein wet strength and resistance to the influence of water are desirable, as in most paper coatings, nonwoven fabrics, certain pressure-sensitive adhesive tapes, and the like, the presence of a water-sensitive ingredient in the polymeric mass is undesirable.

A preferred method of avoiding the presence of water-sensitive elements in a polymeric latex is to employ what is termed herein monomeric emulsion stabilizers — that is, a class of organic monomer which copolymerizes with the ethylenically unsaturated monomers, becoming a part of the final polymer, but which stabilizes the polymerization process against the formation of coagulum and against subsequent phase separation. In accordance with this invention, it has been found that selected quaternary ammonium salts wherein an N-diallylacetamido or N-dimethallylacetamido radical and a lipophilic radical are covalently linked to the quaternized nitrogen are excellent monomeric emulsion stabilizers for the polymerization of ethylenically unsaturated monomers.

More particularly, the compounds of this invention have the formula

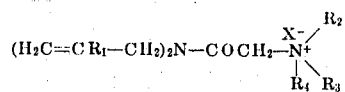

wherein $R_1$ is hydrogen or methyl; $R_2$ and $R_3$ are independently selected alkyl, hydroxyalkyl, aryl, $R_5$—O—CO—CH$_2$— or $R_5$—NH—CO—CH$_2$— wherein $R_5$ is hydrogen or alkyl, or together part of a heterocyclic amino radical in which the quaternary nitrogen atom in formula I is part of the ring; $R_4$ is a lipophilic radical; and $X^-$ is halide, alkyl sulfate, alkyl benzene sulfonate, phenoxy (or alkyl phenoxy) alkylene (or polyalkyleneoxy) sulfate, dialkyl sulfosuccinate or alkyl phosphate.

These compounds I are readily prepared from available materials, and thus are attractive for use in commercial operations.

While any compound having the general formula I can be provided according to this invention, preferred monomeric emulsion stabilizers include those compounds I wherein $R_1$ is hydrogen or methyl;

$R_2$ and $R_3$ are
a. independently selected from the group consisting of alkyl or hydroxyalkyl having one to seven carbon atoms, benzyl, $R_5$—O—CO—CH$_2$— and $R_5$—NH—CO—CH$_2$— where $R_5$ is hydrogen or alkyl having one to four carbon atoms; or
b. together part of a morpholinium or piperidinium moiety;

$R_4$ is a lipophilic radical; and $X^-$ is halide, alkyl sulfate wherein the alkyl moiety has one to 18 carbon atoms, alkyl benzene sulfonate wherein the alkyl group has one to 12 carbon atoms, $R''$—C$_6$H$_4$O—CH$_2$—CHR'''—O—$_n$ CH$_2$—CHR''' SO$_4^-$ wherein $R''$ is hydrogen or alkyl having one to 12 carbon atoms, $R'''$ is hydrogen or methyl and $n$ is zero or an integer, dialkyl sulfosuccinate wherein the alkyl group has one to 24 carbon atoms, or alkyl phosphate wherein the alkyl group has one to 18 carbon atoms.

By the term "lipophilic radical" in the claims and specification herein is meant a radical containing an aliphatic hydrocarbon chain having from about seven to about 28 carbon atoms, and preferably from about nine to about 18 carbon atoms, including saturated, unsaturated, straight-chain and branched groups. This aliphatic hydrocarbon chain can be covalently linked to the nitrogen either directly or through an intermediate linkage as illustrated below where L represents the aliphatic hydrocarbon chain:

a benzyl group,

an ester or amide group such as —CH$_2$—CHR'—ACO—L wherein R' is hydrogen or methyl and A is oxygen or —NH—;

a polyalkylene oxide group such as —CH$_2$—CHR$_6$—(O—CH$_2$—CHR$_6$)$_n$—OL wherein $R_6$ is hydrogen or methyl and $n$ is zero to 4; an acetoxy or acetamido group such as —CH$_2$—CO—OL and —CH$_2$—CO—NHL;

alkylene ethers such as —CH$_2$—O—L and —CH$_2$—CH$_2$—O—L; a hydroxysuccinyloxy or hydroxysuccinylamino group having the formula —R$_7$—A—CO—CHL—CH$_2$—COOH wherein $R_7$ is a diradical, preferably ethylene, propylene, isopropylene, 2-hydroxypropylene, acetoxypropylene, or —CH$_2$—CHR$_8$(O—CH$_2$—CHR$_8$)$_n$— where $R_8$ is hydrogen or methyl and $n$ is zero to 4, and A is oxygen or —NH—; and isomers of the aforementioned hydroxysuccinyloxy or hydroxysuccinylamino groups wherein the aliphatic hydrocarbon chain L is attached to the carbon atom adjacent to the carboxyl group.

The monomeric emulsion stabilizers having the formula I can be synthesized by several convenient methods. For example, all compounds I where $X^-$ is halide, except those where the lipophilic radical comprises an intermediate hydroxysuccinyloxy or hydroxysuccinylamino linkage, can be provided by reacting an N-diallyl-2-haloacetamide or N-dimethallyl-2-haloacetamide with a tertiary amine having the formula $R_2R_3R_4$ wherein $R_2$, $R_3$ and $R_4$ are as previously described or with a mixture of tertiary amines differing in the identity of the $R_4$ group.

Illustrative tertiary amines suitable for use in the preparation of compounds I include methyl n-butyl heptyl amine; methyl dodecyl aminoethanol; di-n-butyl dodecyl amine; di-n-heptyl n-nonyl amine; methyl benzyl iso-octadecyl amine; dimethyl octacosyl amine; N-(decanoyloxy ethyl)piperidine; dodecyl N-dimethylaminoacetate; hexadecyl N-dimethylaminoacetate; N-decyl N'-dimethylaminoacetamide; N-nonylbenzyl N'-diethylaminoacetamide; lauroyl (polyethyleneoxy) N-dimethylamine; decyloxyethyl N-dibutylamine; methyl N-hexadecyl-N-methylaminoacetate, etc.

Compounds I, excluding those where $R_4$ comprises an intermediate hydroxysuccinyloxy or hydroxysuccinylamino linkage, are also provided by reacting N-diallyl-2-haloacetamide or N-dimethallyl-2-haloacetamide with a secondary amine having the formula $R_3R_4NH$ or $R_2R_3NH$ to provide an intermediate tertiary amine which is subsequently quaternized with a compound such as ethyl chloroacetate, propyl chloroacetate, chloroacetamide, methyl bromide, dibutyl sulfate, dodecyl bromide, tridecyl chloroacetate, etc. It will be apparent that the aforementioned reactants will be selected so that there is at least one lipophilic radical in the resulting monomeric emulsion stabilizer I.

Compounds I wherein $X^-$ is halide and $R_4$ is a lipophilic radical comprising an aliphatic hydrocarbon chain covalently linked to the quaternary nitrogen through a hydroxysuccinyloxy or hydroxysuccinylamino linkage can be readily prepared by reacting N-diallyl-2-haloacetamide or N-dimethallyl-2-haloacetamide with a tertiary amino alcohol or amine to provide an intermediate which is subsequently reacted with a succinic anhydride having an aliphatic hydrocarbon group in accordance with the following equations wherein $R_1$, X, $R_2$, $R_3$, $R_7$, A and L are as previously described.

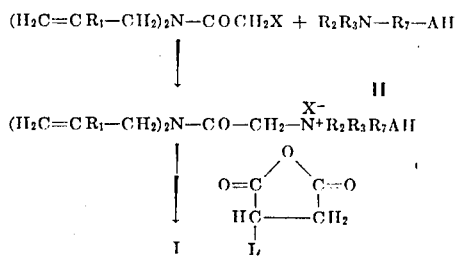

Exemplificative tertiary-amino alcohols and amines II suitable for use in the preparation of compounds I include dimethylaminoethanol, methylpropylaminopropanol, dibutylamino isopropylamine, 3-(N-dimethylamino)-2-acetoxypropanol-1 and N-(hydroxypropyl) piperidine.

The succinic anhydrides having an aliphatic hydrocarbon group are readily provided by known methods, such as by reacting maleic anhydride with an olefin as described in U.S. Pat. No. 2,741,597. Illustrative compounds include heptenyl succinic anhydride, octacosasuccinic anhydride, n-heptyl succinic anhydride, iso-octadecenyl succinic anhydride, etc.

Alternately, the above-described process can be reversed by first reacting the tertiary-amino compound II with the succinic anhydride followed by reaction with N-diallyl-2-haloacetamide or N-dimethallyl-2-haloacetamide. Mixtures of succinic anhydrides differing in the identify of the aliphatic hydrocarbon group can also be employed.

Another procedure for the preparation of compounds I wherein $R_4$ is a lipophilic radical comprising an aliphatic hydrocarbon chain convalently linked to the quaternary nitrogen through a hydroxysuccinyloxy or hydroxysuccinylamino linkage comprises the reaction of a succinic anhydride having an aliphatic hydrocarbon group with an appropriate tertiary amino alcohol or amine containing a diallylacetamido or dimethallylacetamido radical, followed by quaternization as illustrated in the following equation. However, those compounds wherein $R_2$ and $R_3$ are part of a morpholinium or piperidinium moiety cannot be prepared by this method. Any of the previously described quaternizing agents can be used in this reaction.

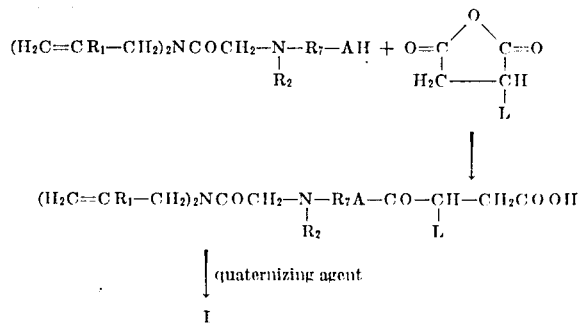

Compounds I herein $X^-$ is other than halide can be provided by reacting the corresponding quaternary ammonium halide with an alkali metal or ammonium salt such as an alkali metal alkyl sulfate, an alkali metal alkyl benzene sulfonate, an ammonium alkyl phenoxy polyalkyleneoxy alkylene sulfate, an alkali metal dialkyl sulfosuccinate or an alkali metal alkyl phosphate. Exemplificative salts include sodium lauryl sulfate, sodium oleoyl sulfate, sodium dodecyl benzene sulfonate, di-tridecyl sodium sulfosuccinate, di-octyl sodium sulfosuccinate, sodium octadecyl phosphate, sodium di-2-ethylhexyl phosphate, etc.

The aforementioned reactions to provide the monomeric emulsion stabilizers I are generally carried out at temperatures from about 0° to 100° C, but higher or lower temperatures can be employed.

Although the reactions proceed readily in the absence of a solvent, diluents such as water, acetonitrile, dimethylformamide, ethyl acetate, methanol and methylene chloride can be suitably employed. Monomers such as acrylonitrile and ethyl acrylate can also be utilized as solvents in the preparation of the monomeric emulsion stabilizers. While compounds I can be isolated prior to use in polymerization reactions, preferably they are used in their reaction solutions.

Particularly preferred monomeric emulsion stabilizers include those compounds I wherein $R_1$ is hydrogen;

$R_2$ and $R_3$ are a. independently selected alkyl having one to four carbon atoms, or b. together part of a morpholinium or piperidinium moiety;

$R_4$ is a lipophilic radical containing an aliphatic hydrocarbon chain having about nine to about 18 carbon atoms; and $X^-$ is chloride or bromide. Of the aforementioned compounds, those wherein $R_2$ and $R_3$ are methyl or ethyl, and preferably methyl, are most suitable for commercial applications.

Illustrative ethylenically unsaturated monomers suitable for copolymerizing with the monomeric emulsion stabilizers of this invention comprise vinyl acetate, vinyl chloride, acrylonitrile, and acrylic monomers in general represented by the formula

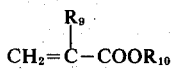

where $R_9$ is a hydrogen atom or a methyl group, and $R_{10}$ is an alkyl radical of one to 14, and preferably one to four carbon atoms. As is known in the art of preparing acrylic ester polymers, the softness of the polymer and the difficulty of initiating polymerization increase as the number of carbon atoms in the ester group increases. In the practice of this invention, when the acrylic monomer contains more than 8 carbon atoms in the ester group, it is advantageous for ease of initiation and polymerization to mix therewith at least about 20 mole percent of an acrylic ester with fewer than four carbon atoms in the ester group.

Mixtures of more than one such ethylenically unsaturated monomer may be used, and in order to impart special properties of toughness, rigidity, or cross-linking reactivity to the polymer, a minor proportion, usually less than 20 mole percent, of the major monomer may be replaced by some other ethylenically unsaturated monomer such as vinyl esters other than vinyl acetate as typified by vinyl laurate and vinyl stearate; vinyl ethers such as vinyl methyl ether, vinyl ethyl ether, and vinyl butyl ether; di-unsaturated monomers such as diethylene glycol diacrylate, ethylene glycol diitaconate, diallyl phthalate, divinyl benzene and the like; acrylic and methacrylic acids, acrylamide and methacrylamide, hydroxyethyl acrylate and methacrylate, hydroxypropyl acrylate and methacrylate, and styrene.

In general, in the polymerization process of this invention, 0.1 to 10 percent by weight of monomeric emulsion stabilizer is employed, with 1 to 5 percent by weight being preferred. The amount of monomeric emulsion stabilizer is based on the total monomers added to the polymerization reaction.

Aqueous polymeric dispersions may be prepared according to this invention in which the solid polymer content is 40 to 50 percent by weight. If desired, the solids content may be diluted to 1 percent by weight or less, with excellent retention of stability at both the higher and lower concentrations.

The monomeric emulsion stabilizers of this invention are useful in both batch and continuous polymerization processes.

The following examples will serve to illustrate the practice of this invention.

EXAMPLE 1

A mixture of N-diallyl-2-chloroacetamide (18.6 g.) and dimethyl dodecyl amine (22.5 g.) in 139 g. of water was tumbled for 24 hours at room temperature to provide a clear, homogeneous solution. This solution was allowed to stand at room temperature for 48 hours. Chloride ion analysis confirmed that diallylacetamido dimethyl dodecyl ammonium chloride had been obtained.

EXAMPLE 2

A mixture of N-diallyl-2-chloroacetamide (18.6 g.) and dimethyl hexadecyl amine (27.8 g.) in 46.4 g. of acetonitrile was allowed to stand for four days at room temperature. Chloride ion analysis confirmed that diallylacetamido dimethyl hexadecyl ammonium chloride had been obtained. The solvent was removed under vacuum, thereby providing a yellow, waxy solid.

A 25 percent by weight aqueous solution of this compound was prepared. The amount of 9 g. of the aqueous solution was charged to a four-neck resin kettle equipped with a thermometer, stirrer, nitrogen inlet and dropping apparatus and ethyl acrylate (75 g.) and water (280 g.) added. The pH of the resulting emulsion was about 5.0. After cooling to 16° C by the use of an ice bath, 10 ml of 3 percent $H_2O_2$ in $H_2O$ were added to the emulsion followed by dropwise addition of a reductant solution comprising 0.02 g. ferrous ammonium sulfate and 0.4 g. ascorbic acid in 10 ml $H_2O$. Polymerization was initiated after 0.8 ml of reductant solution had been added as evidenced by an exotherm of about 22° in 5 minutes. A total of 3 ml of reductant solution was added until completion of the polymerization as evidenced by a lack of exotherm upon the further addition of a slight amount of $H_2O_2$ and reductant. The yield of polymer was 95 percent of theoretical, and no coagulum formed.

EXAMPLE 3

Following the general procedure of Example 2, a mixture of dimethyl (2-lauroyloxyethyl) amine (13.6 g.) and N-diallyl-2-chloroacetamide (9.3 g.) in 22.9 g. of dimethylformamide was allowed to stand for 16 days at room temperature. A clear homogeneous solution was obtained. Ether was added to the solution thereby precipitating a white crystalline material which was isolated from the reaction solution. Chloride ion analysis confirmed that diallylacetamido dimethyl lauroyloxyethyl ammonium chloride had been obtained.

The amount of 2.4 g. of this compound was dissolved in 240 g. of $H_2O$ and 55 g. of ethyl acrylate and 25 g. of butyl acrylate added; the pH of the resulting emulsion was about 5. After cooling to 19° C, polymerization was initiated and maintained by the addition of 10 ml of 3 percent $H_2O_2$ in $H_2O$ followed by the dropwise addition of the reductant solution described in Example 2. A total of 4 ml of reductant solution and an additional 2 ml of $H_2O_2$ solution was employed in the polymerization. The yield of polymer was 95 percent of theoretical and no coagulum formed.

EXAMPLE 4

A mixture of N-diallyl-2-chloroacetamide (18.6 g.) and dimethyl amino ethanol (8.9 g.) in 27.5 g. of acetonitrile was allowed to stand at room temperature for 24 hours. A clear, homogeneous solution containing 98 percent of the theoretical chloride was obtained. The amount of 26.6 g. of tetrapropenyl succinic anhydride, which is an alkenyl succinic anhydride having an average of 12 carbon atoms and one carbon-carbon double bond, was added to the solution; the reaction was slightly exothermic. After allowing the reaction solution to stand for 24 hours at room temperature, the solvent was removed under vacuum to provide 47 g. of viscous, yellow liquid product. Analysis for carboxyl ion content confirmed that diallylacetamido dimethyl tetrapropenylhydroxysuccinyloxyethyl ammonium chloride had been obtained.

An emulsion was prepared from ethyl acrylate (280 g.), butyl acrylate (35 g.), acrylonitrile (35 g.) and $H_2O$ (1,000 g.) employing 10.5 g. of the above monomeric emulsion stabilizer. The pH of the resulting emulsion was 4.5. After cooling to 13°C, polymerization was carried out employing 35 ml of 3% $H_2O_2$ in $H_2O$ followed by the dropwise addition of 10.5 ml of the reductant solution described in Example 2. The yield of polymer was 92 percent of theoretical.

EXAMPLE 5

N-diallyl-2-chloroacetamide (6.6 g.) and N-lauroylaminopropyl-N'-dimethylamine (10.0 g.) were dissolved in a mixture of acetonitrile (16.6 g.) and dimethylformamide (16.6 g.). The reaction solution was allowed to stand at room temperature for 24 hours. Filtration provided a white solid which was washed with ether and dried at room temperature under vacuum. Chloride ion analysis confirmed that diallylacetamido dimethyl lauroylaminopropyl ammonium chloride had been obtained.

To the amount of 2.25 g. of the above compound in 250 g. of $H_2O$ was added 75 g. of ethyl acrylate; the pH of the resulting emulsion was 4.5–5.0. After cooling to 12° C, polymerization was carried out employing 10 ml of 3% $H_2O_2$ in $H_2O$ and 3 ml of the reductant solution described in Example 2. The conversion to polymer was 95 percent of theoretical and no coagulum formed.

EXAMPLE 6

The amount of 1.3 g. of the diallylacetamido dimethyl lauroylaminopropyl ammonium chloride prepared in Example 5 was reacted with 1.0 g. of sodium dodecyl benzene sulfonate in 240 g. of water to provide diallylaminocarbonylmethyl dimethyl lauroylaminopropyl ammonium dodecyl benzene sulfonate.

A mixture of 40 g. of vinyl acetate and 40g. of butyl acetate was added; the pH of the resulting emulsion was 4.5. After cooling to 18° C, polymerization was carried out employing a total of 12 ml of 3% $H_2O_2$ in $H_2O$, and 10.5 ml of the reductant solution described in Example 2. The conversion to polymer was 90 percent of theoretical.

EXAMPLE 7

N-diallyl-2-chloroacetamide (18.6 g.) was added to γ-dimethylaminopropyl amine (10.2 g.) in 28.8 g. acetonitrile; a highly exothermic reaction resulted. After allowing the reaction solution to stand for 48 hours at room temperature, 100 percent of the theoretical chloride ion content was determined by titration. Tetrapropenyl succinic anhydride (26.6 g.) was added to the reaction solution. Removal of solvent under vacuum provided an extremely viscous red-brown liquid. Carboxyl ion analysis confirmed that diallylacetamido dimethyl tetrapropenylhydroxysuccinylamidopropyl ammonium chloride had been obtained.

A mixture of ethyl acrylate (280 g.), butyl acrylate (35 .), acrylonitrile (35 g.) and $H_2O$ (1,000 g.) was emulsified using 21 g. of the above monomeric emulsion stabilizer. The pH of the resulting emulsion was 4.5. After cooling to 14° C, polymerization was carried out employing 35 ml of 3% $H_2O_2$ in $H_2O$ followed by the dropwise addition of 13 ml of the reductant solution of Example 2. No coagulum formed and the conversion polymer was 94 percent of theoretical.

EXAMPLE 8

N-diallyl-2-chloroacetamide (18.6 g.) and 27.4 g. of N-cocomorpholine, which is a mixture of substituted morpholines comprising about 53.0 percent lauryl amine, 19.0 percent myristyl amine, with the balance being predominately a mixture of morpholines having other saturated hydrocarbon substituents, were mixed at room temperature in 40.0 g. acetonitrile. The reaction was refluxed for 5 hours. Chloride ion analysis confirmed that diallylacetamido N-cocomorpholinium chloride had been obtained. Removal of solvent under vacuum provided a partially crystalline product.

Ethyl acrylate (80 g.) in 240 g. of $H_2O$ was emulsified using 2.4 g. of the above monomeric emulsion stabilizer. The pH of the resulting emulsion was 4.5–6.0. After cooling to 15° C, polymerization was carried out employing 12 ml of 3% $H_2O_2$ in $H_2O$ and 6 ml of the reductant solution described in Example 2. The conversion to polymer was 87 percent of theoretical.

What is claimed is:

1. A compound having the formula

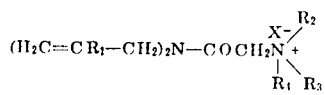

wherein $R_1$ is hydrogen or methyl, $R_2$ and $R_3$ are independently selected alkyl or hydroxyalkyl having one to seven carbon atoms, $R_4$ is a lipophilic radical containing an aliphatic hydrocarbon chain having from about seven to about 28 carbon atoms, and $X^-$ is halide or alkyl benzene sulfonate wherein the alkyl group has one to 12 carbon atoms.

2. The compound of claim 1 wherein $R_1$ is hydrogen or methyl, $R_2$ and $R_3$ are independently selected alkyl or hydroxyalkyl having one to 7 carbon atoms, $R_4$ is a lipophilic radical containing an aliphatic hydrocarbon chain having from about seven to about 28 carbon atoms, and $X^-$ is halide.

3. The compound of claim 2 wherein $R_1$ is hydrogen; $R_2$ and $R_3$ are independently selected alkyl having one to four carbon atoms; $R_4$ is a lipophilic radical containing an aliphatic hydrocarbon chain having about nine to about 18 carbon atoms; and $X^-$ is chloride or bromide.

4. The compound of claim 3 having the formula

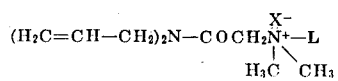

wherein $X^-$ is chloride or bromide and L is an aliphatic hydrocarbon group having from about nine to about 18 carbon atoms.

5. The compound of claim 4 having the name diallylacetamido dimethyl dodecyl ammonium chloride.

6. The compound of claim 4 having the name diallylacetamido dimethyl hexadecyl ammonium chloride.

7. The compound of claim 3 having the formula

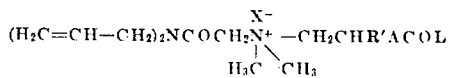

wherein $X^-$ is chloride or bromide, R' is hydrogen or methyl, A is oxygen or nitrogen and L is an aliphatic hydrocarbon group having from about nine to about 18 carbon atoms.

8. The compound of claim 7 having the name diallylacetamido dimethyl lauroyloxyethyl ammonium chloride.

9. The compound of claim 7 having the name diallylacetamido dimethyl lauroylaminopropyl ammonium chloride.

10. The compound of claim 1 wherein $R_1$ is hydrogen; $R_2$ and $R_3$ are independently selected alkyl having 1 to 4 carbon atoms; $R_4$ is a lipophilic radical containing an aliphatic hydrocarbon chain having about nine to about 18 carbon atoms; and $X^-$ is an alkyl benzene sulfonate radical wherein the alkyl group has from about one to about 12 carbon atoms.

11. The compound of claim 10 having the name diallylacetamido dimethyl lauroylaminopropyl ammonium dodecylbenzenesulfonate.

* * * * *